(12) United States Patent
Voruganti et al.

(10) Patent No.: US 10,747,620 B2
(45) Date of Patent: Aug. 18, 2020

(54) NETWORK STORAGE MANAGEMENT AT SCALE USING SERVICE LEVEL OBJECTIVES

(71) Applicant: NetApp, Inc., Sunnyvale, CA (US)

(72) Inventors: Kaladhar Voruganti, Sunnyvale, CA (US); Steven Robert Kleiman, Sunnyvale, CA (US); James Hartwell Holl, II, Sunnyvale, CA (US); Gokul Soundararajan, Sunnyvale, CA (US); Shailaja Kamila, Bangalore (IN); Subramaniam Mohan, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 696 days.

(21) Appl. No.: 14/338,157

(22) Filed: Jul. 22, 2014

(65) Prior Publication Data
US 2015/0142942 A1 May 21, 2015

Related U.S. Application Data

(60) Provisional application No. 61/905,058, filed on Nov. 15, 2013.

(51) Int. Cl.
| | | |
|---|---|---|
| *G06F 11/14* | (2006.01) | |
| *G06F 11/20* | (2006.01) | |
| *H04L 29/08* | (2006.01) | |
| *H04L 12/24* | (2006.01) | |

(52) U.S. Cl.
CPC ...... *G06F 11/1446* (2013.01); *G06F 11/1458* (2013.01); *G06F 11/2094* (2013.01); *H04L 67/1097* (2013.01); *G06F 11/1448* (2013.01); *G06F 11/1461* (2013.01); *H04L 41/5096* (2013.01); *H04L 67/28* (2013.01)

(58) Field of Classification Search
CPC .................................................. G06F 11/2094
See application file for complete search history.

(56) References Cited

U.S. PATENT DOCUMENTS

| | | | | |
|---|---|---|---|---|
| 2008/0270971 | A1* | 10/2008 | Agrawal | G06F 17/50 717/102 |
| 2013/0054426 | A1* | 2/2013 | Rowland | G06F 9/5011 705/27.2 |
| 2013/0111034 | A1* | 5/2013 | Upadhya | G06F 3/0605 709/226 |
| 2013/0166724 | A1* | 6/2013 | Bairavasundaram | G06F 9/5016 709/224 |
| 2013/0268914 | A1* | 10/2013 | Oslake | G06F 8/30 717/120 |
| 2014/0282824 | A1* | 9/2014 | Lango | H04L 63/20 726/1 |
| 2015/0112915 | A1* | 4/2015 | Michael | G06N 5/04 706/46 |
| 2015/0254150 | A1* | 9/2015 | Gordon | G06F 11/1662 714/6.3 |

* cited by examiner

*Primary Examiner* — Tom Y Chang
(74) *Attorney, Agent, or Firm* — Haynes and Boone, LLP

(57) ABSTRACT

Technology is disclosed for managing network storage services by service level objectives (SLOs). The method receives multiple service level capability (SLC) templates; creates at least one storage service level (SSL) instance using at least one of the SLC templates; provisions a storage object located in a network storage infrastructure based on the SSL instance; and services storage requests using the storage object.

20 Claims, 9 Drawing Sheets

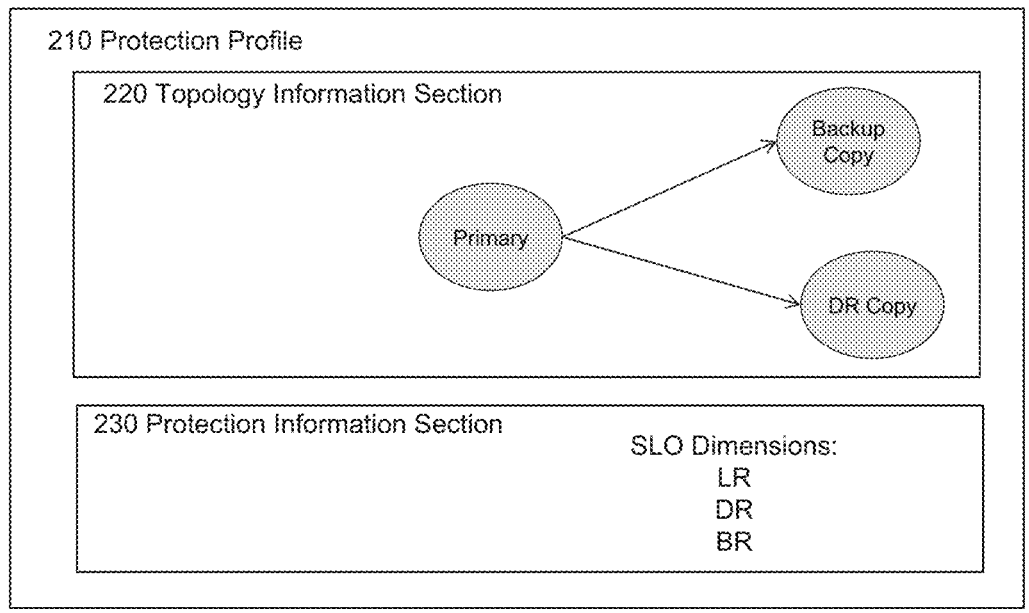
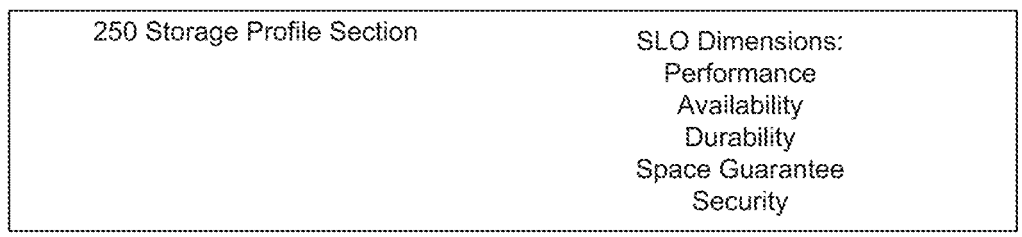
*FIG. 2A*

| SLO Dimension | SLO Fields |
|---|---|
| Performance | Performance Floor<br>Performance Ceiling<br>Workload Definition |
| Local Recovery | RPO<br>Retention Time<br>Schedule Start Time |
| Backup Recovery | RPO<br>Retention Time<br>Schedule Start Time |
| Disaster Recovery | RPO<br>RTO |
| Availability | Number of data copies available |
| Durability | Number of data copies accessible for recovery |
| Space Guarantee | Provisioning Type: Thin or Thick |
| Security | Data Placement<br>Data Access<br>Data Deletion |

*FIG. 2B*

| SLO Dimension | Service Level Capability(SLC)>> | Premium Priority 1 | Standard Priority 2 | Value Priority 3 | Archive/Parking Priority 4 |
|---|---|---|---|---|---|
| Workload Types | Description | High transaction database, High write dynamic, Analytics | Email, Low transaction Database, VM OS, logs | Web servers, sharepoint, office files | Static data, data ingest parking |
| Workload | Read:Write % | 50% | 80% | 90% | 10% |
| Performance | Target Latency | < 10 ms | < 20 ms | < 20 ms | < 30 ms |
| Performance | Target MB/s per Usable TB at Scale | < 400 | < 250 | < 150 | < 50 |
| Performance | Thick/Thin | Thick | Thin | Thin | Thin |
| Tolerate Perf Degradation | | N | N | Y | Y |
| Availability | Number of Head Failures Tolerated | 1 | 1 | 1 | 1 |
| Availability | Number of Disk Failures Tolerated | 2 | 2 | 2 | 2 |
| Availability | Number of Port Failures Tolerated | 1 | 1 | 1 | 1 |
| Space Guarantee | Provisioning Type | Thick Provisioning | Thin Provisioning Type 1 (Overwrites Guaranteed) | Thin Provisioning Type 2 (Overwrites can Fail) | Thin Provisioning Type 2 (Overwrites can Fail) |
| Local Recovery | Retention<br>RPO | 23 hourly + 6 daily + 1 weekly<br>RPO = 1 hr | 12 @2hr + 6 daily + 1 weekly<br>RPO = 2hr | 6 @4hr + 6 daily + 1 weekly<br>RPO=4hr | 6 daily + 1 weekly<br>RPO=8hr |
| BR Disk | Retention<br>RPO | 6 x daily + 3 x weekly + 11 x monthly<br>RPO=Daily | 6 x daily + 3 x weekly + 11 x monthly<br>RPO=Daily | 6 x daily + 3 x weekly + 11 x monthly<br>RPO=Daily | 6 x daily + 3 x weekly + 11 x monthly + 6 annual<br>RPO=Daily |
| BR Tape | Retention<br>Incremental RPO<br>Full RPO | 6 x daily + 3 x weekly + 11 x monthly<br>RPO=Daily<br>RPO=Weekly | 6 x daily + 3 x weekly + 11 x monthly<br>RPO=Daily<br>RPO=Monthly | 6 x daily + 3 x weekly + 11 x monthly<br>RPO=Daily<br>RPO=3 months | 6 x daily + 3 x weekly + 11 x monthly + 6 annual<br>RPO=Daily<br>RPO=3 months |
| Disaster Recovery | RPO<br>RTO | 30 min<br>8 hr | 60 min<br>24 hr | 8 hr<br>48 hr | 16 hr<br>72 hr |

*FIG. 3A*

| SLO Profile | SLO Dimension | SLO Attributes | Sample Settings | Example Vendor Technology Settings |
|---|---|---|---|---|
| Storage Profile | Performance | -Max Acceptable Latency<br>-Target Throughput/GB<br>-Thick Provisioning (Y/N)<br>-Workload Characteristics<br><br>-Conformance Info<br>-Perf Degradation in Failure Mode | <14 ms<br><1000 IOPs<br>Y<br>Random, Read-Heavy<br>90%<br>N | FAS Series: 3200<br>Disk Type: SAS<br>Disk Count: 14<br>FlashCache: Yes |
| Storage Profile | Space Guarantee | Provisioning Type | Thin Provisioning (Overwrites Guaranteed) | Dedup=Y<br>Compression=Y |
| Storage Profile | Availability<br><Number of Failures That can be Tolerated> | -Number of Head Failures<br>-Number of Disk Failures<br>-Number of Port Failures<br>-Number of Shelf Failures<br>-Optional [Number of 9s] | 1<br>2<br>1<br>1 | 2-Way HA<br>RAID-DP<br>LIF Redundancy<br>Sync-Mirror<br>Number of 9s value is derived based on the other settings |
| Storage Profile | Security | -Data Placement<br>    -At rest Encryption<br>-Data Access<br>    -Authentication Type<br>    -End to End Encryption<br>-Data Deletion<br>    -Crypto Shredding<br>    -Assured Deletion | Yes<br><br>Strong<br>Yes<br>Yes<br><br><br>Yes<br>Yes | |
| Protection Profile | Local Recovery | -RPO<br>-Retention Time | 1 hr<br>23hrly + 6 daily + 1 weekly | SnapShots |
| Protection Profile | Backup Recovery | -RPO<br>-Retention Time | 24hr<br>6Daily+3weekly11Monthly | SnapVault |
| Protection Profile | Disaster Recovery | -RPO<br>-RTO | 30 minutes<br>8hr | Async-Mirror |
| Protection Profile | Durability | -Durability % | 99.99% | Probability of not losing data is determined by the number of copies |

*FIG. 3B*

NETWORK STORAGE MANAGEMENT AT SCALE USING SERVICE LEVEL OBJECTIVES

CROSS-REFERENCE TO RELATED APPLICATION

This application claims the benefit of U.S. Provisional Patent Application No. 61/905,058, entitled "MANAGEMENT AT SCALE USING SERVICE LEVEL OBJECTIVES," which was filed on Nov. 15, 2013, and which is incorporated by reference herein in its entirety.

TECHNICAL FIELD

Embodiments of the disclosed technology generally relate to systems and methods for a service level objectives ("SLOs") framework. In particular, embodiments relate to systems and methods for a storage management framework where storage functionality is made available to consumers in the form of services.

BACKGROUND

Network storage is commonly used to make large amounts of data accessible to multiple users, to archive data, and for other purposes. In a network storage environment, a storage server makes data available via a data communication network ("network") to client ("host") systems by presenting or exporting to the clients one or more logical containers of data. There are various forms of network storage, including, for example, network attached storage ("NAS") and storage area network ("SAN"). In a NAS system, a storage server services file-level requests from clients, whereas in a SAN a storage server services block-level requests. Some storage servers are capable of servicing both file-level requests and block-level requests. In a large-scale network storage system, such as those used in many large business enterprises, it is often important to consistently maintain a high level of performance (throughput, efficiency, etc.). Due to the large scale of each system, storage administrators can face challenges when dealing with the complexities of shared storage environments, e.g., when they have to provision or de-provision hundreds or thousands of applications, users, or workloads each day.

BRIEF DESCRIPTION OF THE DRAWINGS

Objects, features and characteristics of the disclosed technology will become more apparent to those skilled in the art from a study of the following detailed description in conjunction with the appended claims and drawings, all of which form a part of this specification. In the drawings:

FIG. 2A is a block diagram illustrating a sample Service Level Capability ("SLC") template.

FIG. 2B is a table diagram illustrating a table with multiple sample Service Level Object dimensions.

FIG. 3A is a table diagram illustrating multiple sample storage service templates.

FIG. 3B is a table diagram illustrating samples of service level object dimensions and fields in the dimensions.

DETAILED DESCRIPTION

Figure 1:
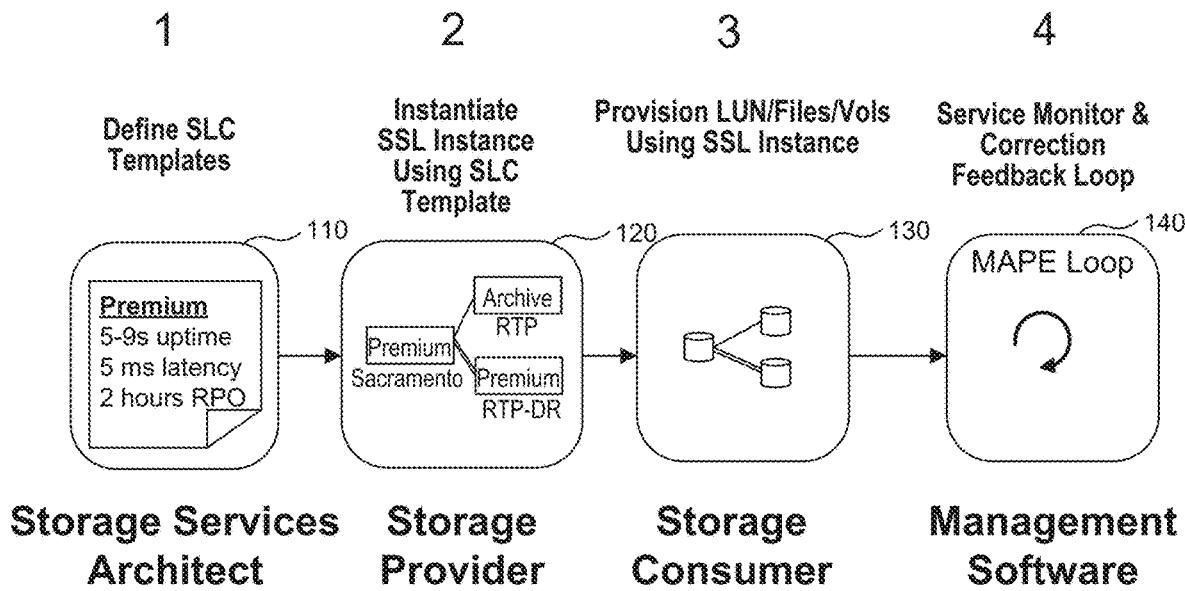
FIG. 1 is a flow diagram illustrating a process for managing data storage services by SLOs, in various embodiments.

Technology is disclosed for managing network storage services by service level objectives. The disclosed technology can define multiple service level capability templates and create at least one storage service level ("SSL") instance using at least one of the service level capability templates. Storage objects can be provisioned and located in a network storage infrastructure based on the storage service level instance. The storage objects can be used to service storage requests. The disclosed technology describes the storage services via measurable attributes that are independent of vendor technology. The disclosed technology treats different SLO dimensions in an integrated manner and selects storage and application level templates accordingly. An SLO dimension is a type of service performance requirement.

Storage services that employ the disclosed technology can be described using vendor-technology-independent attributes. These attributes can be categorized into multiple "buckets," of SLO dimensions, e.g., performance, local recovery, disaster recovery, backup recovery, space guarantee, availability and security. These SLO dimensions' attributes can be quantitative, and thus, measured both by storage providers and storage consumers to assess whether a service is meeting its stated objectives. In this SLO-based management paradigm, applications describe their requirements in SLO terms; storage systems also describe their capabilities in SLO terms. Thus, SLOs are the common "language" in which the requirements and capabilities are described and communicated between storage consumers and providers.

The disclosed technology enables the codifying of storage practices in a formal and systematic way into templates that can be used to instantiate storage services. These templates can be qualified, e.g., by storage services architects or other users. The templates can be qualified either at a storage level or at an application level. Storage level templates can package storage functionality using the SLO dimensions that have been listed in packages, e.g., Premium, Standard, Archive, etc. Application templates can describe which storage level services are being used for the different application data types. For example, an application service, e.g., an email exchange service, can leverage different levels of service for its different data types, e.g., Standard Service Level for log and temporary data, and Premium Service Level for user data. Thus, the disclosed technology provides support for both application-centric and storage-centric views regarding storage service management.

The disclosed technology provides a "clean" framework that treats various constructs (e.g., Datasets, Consistency Group Containers, Storage Objects (e.g. logical unit number ("LUNs"), Files, Volumes) and Tenants) in a uniform way. There can be a hierarchy between Tenants, Applications and Storage Objects. That is, a tenant can perform (or execute) many applications, and an application can utilize many storage objects. The technology provides semantics for how storage service levels can be specified across these various constructs in the hierarchy.

To implement this management by an SLO framework, in addition to describing storage services as described above, there can be a vendor-specific backend SLO automation framework to automate storage provisioning tasks, monitor SLO conformance of the storage services, and take corrective actions to either avoid or correct SLO deviations or "violations."

1. Management by SLOs

There can be different parties or classes of users (also referred to as personas) whose needs may be analyzed to determine SLOs. These parties can include, e.g., a storage service architect, storage provider, and storage consumer. Storage service architects design storage service level capability templates that codify best practices or based on other preferences or requirements. Storage service architects can act, e.g., on behalf of storage vendors, storage partners or data center architects at the customer sites. In many organizations, storage service architects can work with business analysts to determine storage service level requirements.

Storage providers can instantiate storage service level instances or SLOs, e.g., using the templates that have been designed by the storage service architects. In some organizations, the role of the storage provider is split between a lead engineer who does the initial provisioning and problem resolution, and a storage administrator who performs day-to-day reporting and monitoring operations.

Storage consumers consume the storage service level instances that have been created by a storage administrator or a storage provider. In some organizations, storage consumers have a separate tenant administrator who manages virtual data center resources. The tenant administrator, in turn, can interact with different application administrators to provision storage for different applications.

The personas described above can be administrators with different responsibilities and who face different types of challenges.

Management at Scale: Storage administrators face challenges in dealing with the complexities of shared storage environments, e.g., when they provision and de-provision hundreds or thousands of applications, users or workloads. To ease this burden, the disclosed SLO technology provides the ability to successfully automate common provisioning and management workflows, and monitors compliance with service objectives. The disclosed technology provides an automation engine that can operate at scale and determine where to provision new storage, as well as what actions to take when SLO violations occurs. To operate without over-provisioning resources and to satisfy SLOs, the automation engine can 1) quantitatively analyze the requirements of the provisioning requests, 2) quantitatively determine the current resource utilization (also referred to as headroom), and 3) proactively assess the impact of placing a new load on existing resources. Thus, the ability to describe service requirements and monitor both resource utilization and service conformance is useful for managing resources at scale in a cost-effective manner.

Technology Independence: Traditionally, storage services architects design storage services based on underlying hardware and/or software technologies. For example, "Gold" storage service can mean the use of solid-state drives ("SSDs") and "Bronze" storage service can mean the use of Serial Advanced Technology Attachment ("SATA") disks. However, nowadays, the same underlying hardware resources (e.g., Hybrid Storage consisting of a combination of SSDs and SATA disks) can support both "Gold" and "Bronze" service types by dynamically controlling the amount of SSD resources allocated to a particular service. Thus, it can be useful to describe storage services independently from the underlying hardware technology. Furthermore, it is desirable for storage service architects to be able to change the underlying technology for a particular storage service type. For example, while a "Gold" service may be implemented using fibre channel disks, the same service may be implemented alternatively using SSDs.

Technology Complexity: With the increasing complexity in integrating various types of hardware and software resources, storage architects and storage providers may prefer integrated shared infra-structure architectures where the computing, networking and storage resources are packaged into a cohesive, integrated unit. Similarly, it can be useful to help storage architects with the task of designing storage services because they may find it difficult to properly understand hundreds of technology configuration choices (also referred to as "knobs"). In many cases, users (e.g., storage administrators or consumers) hesitate to utilize new features due to the complexity of the various settings. Thus, the disclosed technology can provide storage service templates that codify underlying technology combinations and have been well tested and qualified in labs. The disclosed technology can provide canned (e.g., preconfigured) workflows that implement best practices and are kept up to date with the changes in the underlying technologies and best practices, and they can be fine-tuned with regard to storage service level definitions.

Integration difficulties across different storage stacks: Increasingly, a single storage stack may be not enough to cost-effectively satisfy the performance, capacity, protection and availability requirements of different applications. Thus, storage device vendors are beginning to provide different storage stacks like pure flash arrays, traditional disk-based storage controllers, scale-out capacity layers, and archival storage for satisfying different performance and availability requirements. To make it easier for the storage consumers to consume storage across these various stacks, storage providers can provide a technology-independent service interface and automatically move data between the stacks as the value of data changes over time. For example, data may initially be stored in a pure flash array for immediate availability and then moved to slower storage later, when the data needs to be accessed less frequently.

2. Management by SLOs Workflow

In a management by service level objectives framework, administrators can specify storage needs using SLOs, and let the storage management system map these SLOs to define low level configuration settings. The management by SLOs frameworks workflow shown in FIG. 1 is described below in four parts.

In this detailed description, numerous specific details are set forth to provide a thorough understanding of embodiments. It will be apparent, however, to one skilled in the art that embodiments may be practiced without some of these specific details. In other instances, well-known structures and devices are shown in block diagram form.

Embodiments include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), field programmable gate arrays (FPGAs), application-specific integrated circuits (ASICs), vehicle identity modules (VIMs), magnetic or optical cards, flash memory, or other type of media/machine-readable medium suitable for storing electronic instructions.

Moreover, embodiments may also be downloaded as a computer program product or data to be used by a computer program product, wherein the program, data, and/or instructions may be transferred from a remote computer to a requesting computer by way of data signals embodied in a carrier wave or other propagation medium via a communication link (e.g., a modem or network connection). For some parts of the program, data or instructions, this communication link may include the power transmission facilities ("in-band"). For other parts of the program, data, or instructions, this communication link may include external networks such as the telephony network (e.g., Public Switched Telephone Network, cellular, WiFi, and other voice and wireless networks) or the Internet ("out-of-band"). In some cases, the communications link may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

The term "embodiments," phrases such as "in one embodiment," and the like, generally mean that the particular feature(s), structure(s), method(s), or characteristic(s) following or preceding the term or phrase is included in at least one embodiment, and may be included in more than one embodiment. In addition, such terms or phrases do not necessarily refer to the same embodiments.

If the specification states that a component or feature "may," "can," "could," or "might" be included or have a characteristic, that particular component or feature is not required to be included or have the characteristic.

FIG. 1 is a flow diagram illustrating a process for managing data storage services by SLOs, in various embodiments. As shown in FIG. 1, the SLO framework comprises four steps. The first step 110 is defining a Service Level Capability Template. In the SLO framework, the storage services architect can define storage service templates (SLCs) in both quantitative and vendor-technology-independent terms. For example, instead of describing "Premium" storage service as being composed of Fiber Channel disks, RAID-DP, etc., the SLC template can be defined in terms of SLO dimensions, e.g., Performance, Local Recovery, Backup Recovery, Availability, Security, Space Guarantee, etc.

The second step 120 of the workflow of FIG. 1 is Creating a Storage Service Level Instance. A storage provider uses the SLC templates that have been provided by the storage services architect and instantiates storage service level instances on the resources in their data centers. To accomplish this step, the following tasks may need to be performed.

I. Capacity Planning: The architects in the service provider organization may perform a capacity planning operation to procure the appropriate type of storage hardware. Depending upon the type of SLO that they would like to support, the architect may procure the appropriate type of storage resources. Thus, the capacity planning tool can also be SLO "aware," so as to take requirements in SLO terms and then propose appropriate hardware to procure.

II. Physical Infrastructure Setup: Data center operators in storage provider organization physically wire and set up storage hardware.

III. Design Storage Service Levels: Architects in storage service provider organizations design storage service levels that they want to provide to storage consumers. They design these storage service levels to satisfy the needs of different types of applications and their corresponding SLOs that they want to support. Providers usually provide ("advertise") several storage service levels. They specify their requirements via a Provider SLO Requirements Profile and subsequently select and customize an appropriate SLC template to satisfy their requirements. Creating and qualifying a new SLC is not a trivial task, and thus, storage providers can create and qualify a new SLC in conjunction with storage vendors.

IV. Select Data Center Resources: Storage providers select appropriate sets of resources across multiple data centers and assign the resources in storage domains that can be used by the storage service level instance being created. The same physical storage resource can be used by multiple storage service level instances of different types (e.g. Gold or Silver, etc.). Usually, there is a set of candidate resources in a storage domain, and the particular resource on which provisioning takes place is selected by a planning tool at provisioning time (e.g., step 3 in FIG. 1) based on space and performance utilization. Providers can configure storage resources, e.g., storage media pools, virtual storage servers, and storage controller network configuration during this step.

V. Instantiate Storage Service Level (SSL) instance: The storage providers can provide a provider with the SLO requirements profile, storage domain, and SLC template as part of the storage service catalog for creating the storage service level instance. As part of this storage service level instance creation process, the storage providers can also specify the price that they would like to charge, a user friendly name for the service, and also some text describing the particular SSL instance. Providers can create multiple SSL instances using the same SLC template.

There can be differences between SLOs and service level agreements ("SLAs"). SLAs can include penalty functions and process-related issues that are decided upon by the storage provider. Thus, a provider can build SLAs on top of the SLO framework being described herein.

The third step 130 of the workflow of FIG. 1 is Provisioning Resources. Storage consumers, e.g., application administrators using storage management tools, can define the application level requirements by selecting an appropriate existing SSL instance. They can manually specify their application level requirements and select an appropriate storage service level instance. Alternatively, this specification can be done in an automated manner by an orchestrator or a hypervisor management tool. Subsequently, a storage consumer can provision LUNs, shares, files or volumes using an SSL instance (e.g., Gold SSL instance) that has been provided by the storage provider. Storage consumers can specify capacity, export policy and protocol information during resource provisioning. Storage consumers can also specify the name of the storage service level instance, e.g., when they create storage objects via an object protocol.

The fourth step 140 of the workflow of FIG. 1 is Service Management Automation. Once an application provisions storage (e.g., step 130 in FIG. 1) of a particular SSL instance (e.g., Premium, Standard, Value, etc.), an underlying set of internal management constructs get created to monitor the SLOs, analyze potential violations proactively or reactively, plan corrective actions, and execute the corrective action via a workflow. These four tasks are performed continuously as a feedback loop to avoid or react to service violations (step 140 in the SLO workflow, also referred to as a Monitor, Analysis, Plan, Execute (MAPE) loop). To enforce an SLO, there can be a hierarchy of MAPE loops that are coordinated across multiple layers and vendor management systems. The actions (e.g., monitoring, analysis and planning) within a single MAPE loop can be done at different frequencies. For example, monitoring operations can be done at a higher frequency than analysis or planning actions.

FIG. 2A is a block diagram illustrating a sample Service Level Capability template. The SLC template 200 includes a protection profile 210 and a storage profile 250. The protection profile 210 includes a topology information section 220 and a protection information section 230. The topology information section 220 includes data replication topology information about a topology of data storages of a particular SLC template.

For example, a primary copy of data 222 can have a local backup copy 224 and also a remote disaster recovery copy 226 (e.g., "in the cloud"). The protection information section 230 includes protection characteristics of each of the nodes ("copies") in the topology that can be described using various protection SLO dimensions, e.g., local recovery (LR) dimension, backup recovery (BR) dimension and disaster recovery (DR) dimension. The Local Recovery Dimension deals with operational errors that invalidate a copy of data, and how to fix the errors by getting a prior version of the data. The Backup Recovery Dimension deals with operational errors as well as machine failures. The Disaster Recovery Dimension deals with site failures and continuous replication technologies.

The storage profile 250 describes storage characteristics of each of the nodes in the protection profile via various SLO dimensions, e.g., performance, availability, durability, space guarantee and security. In some embodiments, the SLC template can include multiple storage profiles associated with the multiple nodes ("copies") in the protection profile. Storage service architects can define the SLC templates by adjusting the dimensions in the Protection Profile and Storage Profile.

FIG. 2B is a table diagram illustrating a table with multiple sample Service Level Object dimensions. The SLO dimensions can include, e.g., performance, local recovery, backup recovery, disaster recovery, availability, durability, space guarantee and security.

The performance dimension can include various dimension fields, e.g., performance floor, performance ceiling, and workload specification. The performance floor can be specified, e.g., by an input/output (I/O) throughput at a certain latency at a certain confidence level for certain conformance time window. For example, the performance can be specified as 100 GB I/O throughput per second at 5 millisecond latency, for one hour of conformance time window at a 90% confidence level. The 90% confidence level means that it is guaranteed that at least 90% of the one hour conformance time window, the performance is at least 100 GB I/O throughput per second at 5 millisecond latency.

The performance ceiling specifies that at any point of time, the performance will not exceed certain ceiling value of I/O throughput, e.g., 100 GB I/O throughput per second. The workload specification can include read/write percentage, random I/O and sequential I/O percentages, a working set size (a size of data actively being accessed at any point of time), and average I/O throughput size.

The backup recovery (BR) dimension can include, e.g., recovery point objective (RPO), retention time, and schedule start time. The recovery point objective specifies how often the backup of the data is generated and stored at a backup machine. The backup is available for data recovery. For example, if the recover point objective is set to one hour, the backup of the data is generated each hour. The latest previous version of the backup copy is thus less than one hour old. The retention specifies how many copies will be kept for the data. For example, if the retention is set to 5 copies daily, of five total backup copies of the data will be kept for each day. The schedule start time specifies the time in the day at which the backup task starts.

Similar to the backup recovery dimension, the local recovery (LR) dimension can include, recovery point objective (RPO), retention time, and schedule start time. The difference between the two is that the local recovery dimension specifies how the storage server itself performs backup tasks locally (e.g., checkpoints), instead of how a separate computing device performs backup tasks as specified by the backup recovery dimension.

The disaster recovery dimension can include dimension fields, e.g., recovery point objective (RPO) and recovery time objective (RTO). The recovery point objective specifies how often the backup of the data is generated and stored. The recovery time objective specific how quickly the data can be recovered.

The durability dimension specifies how many backup copies of the data are available for recovery purposes. The durability dimension can be dependent upon the number of backups specified by the BR, LR and DR dimensions.

The availability dimension specifies the total number of data copies available. The difference between the availability dimension and the durability dimension is that data copies specified by the availability dimension needs to be available but not necessarily accessible. For example, if a storage server containing a data copy is temporarily down for reasons such as network problem or machine failure, that data copy is still counted as available for the availability dimension.

The space guarantee dimension specifies whether the data storage should be thin-provisioned or thick-provisioned. Thick provisioning is a virtualization technology to give the appearance of having more storage space than actual available storage space. Thin provisioning maximizes space utilization. There is no write success guarantee for thin provisioning. Thick provisioning is based on the actual available storage space. There is always a write guarantee for thick provisioning. In some embodiments, the space guarantee dimension can specify an auto space provisioning. The auto space provisioning makes best effort to retain write guarantee while automatically utilizing thin provisioning whenever it's feasible.

The security dimension can include various dimension fields relating to data security, e.g., data placement, data access and data deletion. The data placement field can specify, e.g., at-rest encryption, geo-locality and re-key schedule. The at-rest encryption specifies the encryption method for the data stored. The geo-locality specifies the geographical locations that the data can be stored or locations that the data cannot be stored. For example, the geo-locality may specify that particular data cannot be stored in any data servers in a particular geographic area, e.g., the United States. The re-key schedule specifies the time schedule for re-key the data encryption for enhanced data security. For example, the re-key schedule may specify that the encryption of a particular data needs to be re-keyed (e.g., re-encrypt the data using a new key) for every week.

The data access field can specify, e.g., authentication and end to end encryption. The authentication specifies a choice of authentication protocol or level (e.g., strong, medium, or weak) for data access. The end-to-end encryption specifies whether an encryption is used when the data is transferred, e.g., between data storage servers or transmitted to a client device.

The data deletion field can specify, e.g., assured deletion or crypto deletion. The assured deletion means that the data is confirmed to be deleted from the storage server. The crypto deletion means that the data is deleted form the storage server and that cryptographic data is written to the storage space where the data was previously stored. The data blocks are overwritten so that the data cannot be recovered. In some embodiments, a crypto deletion can be a way to assure deletion.

FIG. 3A is a table diagram illustrating multiple sample storage service templates. The columns in FIG. 3A list some sample SLCs. An SLC can include multiple SLO dimensions. The rows in FIG. 3A are SLO dimensions and the corresponding attributes for the SLO dimensions. The SLO attributes for the SLO dimensions (e.g., rows in FIG. 3A) can be specified in technology-independent terms. For example, the provisioning types can be "overwrites guaranteed" and "overwrites can fail," instead of reciting terms or requirements that are specific to technologies of devices from a specific vendor.

The notion of "SLO dimensions" makes it easier to define hundreds of storage controller settings with a handful of technology-independent attribute settings, so that storage providers can easily understand and implement the functionality they decide. The SLC template creation process is a bottom-up process rather than a top-down process. Storage service architects can package a set of technologies together, test them out in a lab, and then assign the appropriate SLO attribute values to the templates. The underlying storage configuration can be, but need not be, automatically determined for any input SLO combination.

Furthermore, the SLO attributes are measurable and quantitative in nature. Using quantitative attributes helps storage providers and management software because they can receive requirements in quantitative terms. This also helps storage consumers because they can quantitatively see whether the storage service meets its stated SLO objectives.

The technology helps storage service architects to understand the impact of combining various underlying hardware and software technologies when creating an SLC template. In the SLO framework, the technology enables the creation of pre-packaged SLC templates (e.g., columns in FIG. 3A). A workflow can be generated or associated with each pre-packaged SLC template that automates the process of storage provisioning. The workflow takes into account the impact of replication and background tasks, and also instantiates underlying service monitoring and conformance constructs. Each storage stack can have its own customized workflows for a particular SLC. A storage stack is a class of data storage hardware, e.g., commercialized by a storage vendor. These pre-packaged SLC templates can be created by storage vendors, partners, or by storage architects at the storage provider's site. The SLC templates can be initially specified by storage vendors, and later optionally modified by storage architects or other users.

Application requirements (e.g., as SLO Requirement Profile) and capabilities of the storage system (e.g., as SLC Templates) can be described using SLOs. Thus, SLOs are a vendor-technology-independent "language" for specifying application requirements and system capabilities. FIG. 3B is a table diagram illustrating samples of various SLO dimensions and the fields in these dimensions. The columns of this table include:

SLO Profile Type: An SLO dimension can belong to a Protection Profile or a Storage Profile. The SLO dimensions can be being grouped into at least these two profiles. Storage service architects can define the SLC templates by adjusting the dimensions in the Protection Profile and Storage Profile. An SLC template can comprise a protection profile, and there can be one or more storage profiles associated with the protection profile. The protection profile describes the topology of the service. There is a storage profile associated with each node in the topology, and one of local recovery, backup recovery and disaster recovery SLO dimensions are associated with each of the edges in the protection profile topology.

SLO Dimension Name: names of SLO dimensions that describe the protection and storage type attributes of any associated storage object.

SLO Dimension Attributes: An SLO dimension can include a list of SLO attributes that capture the characteristics of that SLO dimension. The SLO attributes can be vendor-technology-neutral.

Sample SLO Attribute Settings: This column has examples of how the SLO attribute values would be set. For example, the SLO attributes can include descriptions of underlying system capability and default user requirement. Default user requirements can include, e.g., workload characteristics, conformance information, and retention time information. These requirements can be further fine-tuned, e.g., when creating a Storage Service Level (SSL) instance.

Vendor Technology Specific Details: In this column, a few vendor specific technologies can be listed as samples. The values in this column can be specific to storage controllers from different vendors.

The SLC template can be used to codify multiple underlying storage controller settings, and to describe the settings in a vendor-technology-independent manner. A storage services architect can handcraft an SLC template by choosing the appropriate underlying technologies and create a workflow script for a particular SLC (for a given storage controller), and assign values for the SLO attributes that describe the SLC template. An SLC template may include a high level description and vendor-dependent configuration information.

High Level Description of SLC Template: a high level description can be provided with an SLC Template to inform the storage providers about the capabilities of the SLC template. For example, a solution architect can define the SLC templates as <High Transaction Database, High Write Dynamic, Analytics>, <Email, Low Transaction Database, VM OS, Logs>, <Web Servers, SharePoint, Office files>, or <Static Data, Data Ingest Parking>.

SLC description in Vendor-Independent SLO terms: An SLC template is described using vendor/storage controller technology-independent terms. A storage provider can easily select an appropriate SLC template to satisfy its needs by identifying suitable terms. The SLC description in vendor-independent SLO terms can include a protection profile and a storage service profile.

Implementation Details of the SLC Template: Each SLC template can be implemented via multiple different underlying storage controller types and technologies. The storage vendors (architects) can qualify multiple underlying storage controller types for each of the SLC template definitions. The implementation details for realizing a SLC template on a particular storage controller type are stored as either workflows or as meta-data information.

Performance Dimension describes the performance characteristics in terms of expected latency and throughput for a particular type of workload that is associated with the SLC template. Availability Dimension describes various types of failures and the failure protection mechanisms being provided by the SLC template. For example, site failure protection can be described as part of the disaster recovery attribute. The availability dimension can cover, e.g., disk failures, storage controller head failure, copy failures, link failures and shelf failures. Space Guarantee Dimension describes whether space is being thinly or thickly provisioned. Security dimension covers the security aspects related to, e.g., data placement, data access and data deletion operations.

These pretested SLC templates help storage providers because 1) they provide a level of indirection between the SLC template definition and the underlying technology being used to implement the particular SLC definition, and thus, leverage newer, cost-effective technologies without changing the SLC template definition; 2) they ensure that the various technology settings work well together; and 3) they quantify the load that gets placed on the storage system due to new provisioning actions. This, in turn, helps the management software to make more informed resource provisioning decisions, and thus, helps storage providers to increase the utilization of their storage resources. 4) The pre-tested SLC templates help to simplify the storage service level support workflows due to the standardization of the underlying configuration settings. It is useful to note that this framework also enables storage providers and users to create new SLC templates, but then the storage providers and users are responsible for ensuring that they operate in the intended manner by qualifying (e.g., testing) the SLC templates themselves or in conjunction with the solution provider.

2.1 Application Requirements to Storage Capabilities Mapping

Figure 4:
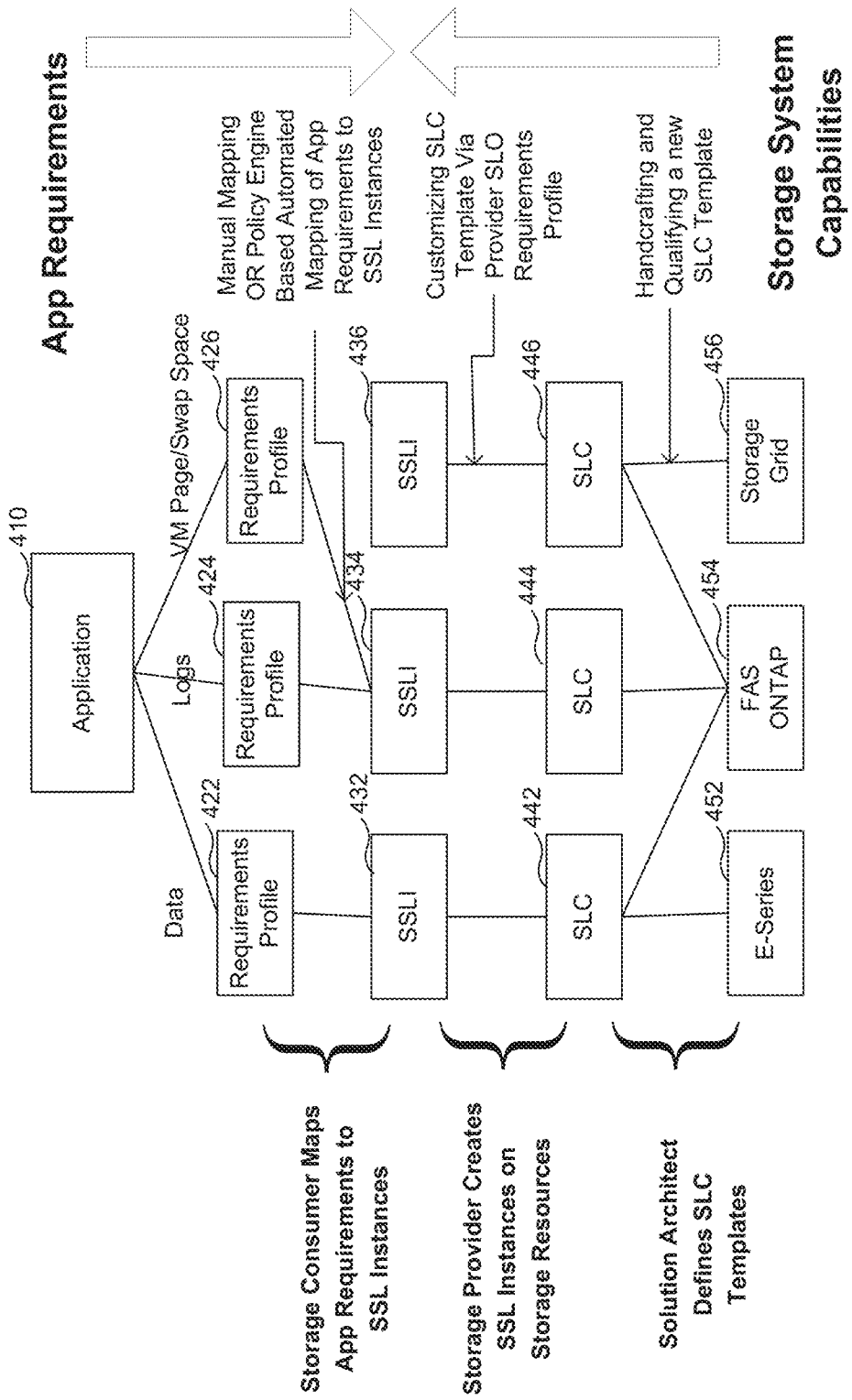
FIG. 4 is a block diagram illustrating a mapping of application requirements to storage capabilities, in various embodiments.

The management by SLO paradigm can define application level storage requirements with underlying storage controller capabilities. FIG. 4 is a block diagram illustrating a mapping of application requirements to storage capabilities, in various embodiments. This can be done at multiple levels.

Creation of a new SLC Template: Storage service architects can create Service Level Capability (SLC) templates 442, 444 and 446 to satisfy the needs of some of the common applications and workloads. SLC templates 442, 444 and 446 can, e.g., support multiple types of applications/workloads. The SLC templates 442, 444 and 446 make the planning, deployment, management and support processes simple and tractable for service providers.

Customization of SSL Instance: Storage providers can take the SLC templates 442, 444 and 446 (that have been designed by storage vendors or storage service architects) and customize them with respect to the type of applications they want to support. The storage providers may also keep some buffer between what they want to advertise and what the system is actually providing. For example, even if the SLC template is capable of providing a latency of less than 5 ms, the storage provider can choose to advertise that the storage service level instance (SSLI) will provide a latency of less than 10 ms. Storage providers can customize performance expectations of SLOs (e.g., latency, throughput), and protection levels of SLOs (e.g., protection start times). This customization of the SSLIs 432, 434 and 436 can be done via the Provider SLO Requirements Profile 422, 424 and 426. Storage providers can also create storage service level instances using Application Templates that target specific applications for any best-practices data that is available with respect to workload characteristics and protection requirements. The application templates can be created by storage service architects at storage vendor or storage provider organizations.

Mapping of Application Level Requirements to SSL Instance: Once storage providers have created and provided SSL instances 432, 434 and 436, storage consumers can map their application level requirements 422, 424 and 426 to the appropriate underlying SSL instances 432, 434 and 436, based on functionality and price. This can be performed manually, or via an automated orchestrator and hypervisor management tools.

For example, the application 410 can be an, e.g., an application for email exchange service. The storage consumer determines that the application 410 can utilize different data storage service for the data, logs and virtual machine (VM) page and swap space of the application 410. The storage consumer specifies requirements profiles 422, 424 and 426 for different service requirements of the data, logs and virtual machine (VM) page and swap space. The storage provider supplies the SSL instances 432, 434 and 436 so that the storage consumer can map the requirements profiles 422, 424 and 426 to the SSL instances 432, 434 and 436.

Even though this disclosure specifies what types of workloads can be satisfied by the different SSL instances, there can be cases when consumers do not know which SSL instance to choose for their proprietary application. Instead of choosing an incorrect storage service level that leads to SLO violations or an under-utilization of resources, the consumers can choose a default SSL instance and the SLO framework will monitor the SLO requirements and the actual resource utilization, and then advise the consumer (e.g., if the provider chooses to do this) to select the correct SSL instance. The framework can also provide workflows that help the administrator move their data to the correct storage service level.

3. Application Programming Interfaces (APIs)

To interact with the management of SLOs paradigm, the following classes of APIs can be provided for the different types of administrators described above.

Storage services architect APIs: These APIs can be used to create new SLC templates and Application Templates.

Storage Provider APIs: These APIs can be used by a Storage Service Provider to instantiate new storage services using SLC templates, Provider SLO Requirements Profile and Storage Domains. There are APIs that enable service providers to see the details of SLC templates, monitor services and take corrective actions when services are violated. There are also APIs to enable a Service Provider to create new Tenants and control their access to SSL instances. Finally, there are APIs that enable providers to report on the consumption of various resources by the different Tenants/App Admins.

Storage Consumer APIs: These APIs can be used by a Tenant Admin or Application Admin to provide new storage objects (LUNs, files, Volumes, Objects) corresponding to different SSL instance types and monitor whether the described service levels are being met. These APIs also enable these Admins to take inventory of their storage objects and get reports on their resource consumption.

Figure 5:
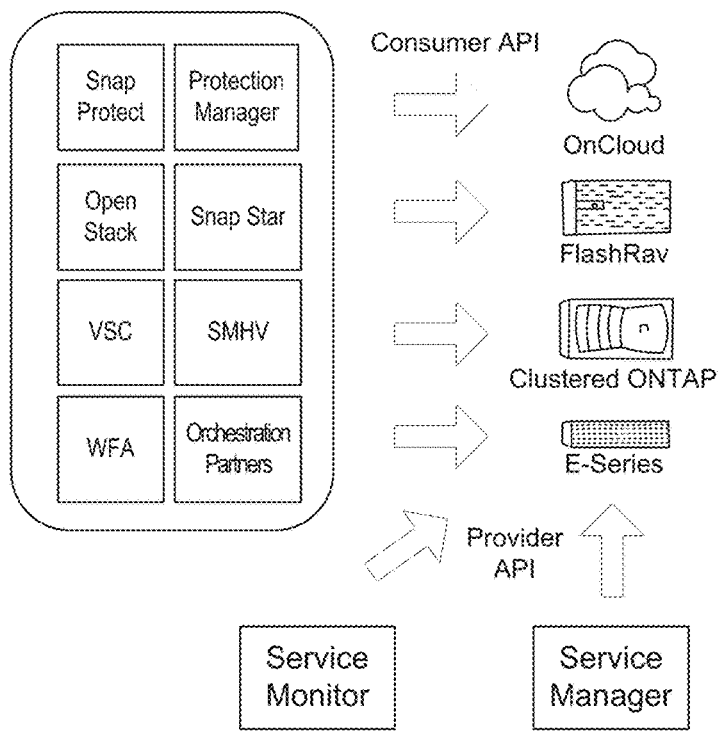
FIG. 5 is a block diagram illustrating consumer and provider application programming interfaces ("APIs").

FIG. 5 is a block diagram illustrating consumer and provider APIs. As described above, in some organizations storage providers can design new SLC templates, and storage subscribers can act as a combination of Tenant administrators and Application administrators.

3.1 Storage Consumer APIs

The storage subscriber APIs can utilize the following principles:

They can be vendor-agnostic. The APIs do not need to refer to vendor-specific storage constructs, nor do they need to describe the capabilities of a storage service by referring to vendor-specific features or technologies.

The APIs can be consumption-centric. Rather than modeling a storage array or even an SSL instance, the APIs can be focused on creating and managing the objects that are ultimately consumed by subscribers in the form of exports, shares, LUNs and files.

The APIs can be a natural fit for drivers. Many orchestrators have storage interface layers with drivers. These APIs are intended to be easily wrapped in a driver implementation of these interfaces.

3.2 SLO Example

A storage provider can use the storage provider APIs to create storage services. An SSL instance can be a combination of an SLC template and one or more storage domains. The storage provider can then use the storage provider APIs to onboard a new tenant. As a result, the tenant now has a management end-point to connect to the storage service.

A tenant administrator can use the storage subscriber APIs to discover what services are being offered to him. "storage-service-level-instance-list" returns a list of services and their descriptions, both of which are defined by the provider.

| API | Required Inputs | Optional Inputs | Outputs |
|---|---|---|---|
| SSL-Instance-List | | SSL-Instance-name | SSL-Instance-name[ ], service-description[ ] |

Now the tenant is ready to start provisioning storage. For example, the tenant administrator can create an export by calling "export-create-by-service" and pass a name of a storage service and desired size as parameters.

| API | Required Inputs | Optional Inputs | Outputs |
|---|---|---|---|
| export-create-by-service | SSL Instance, size, export-name, export-policy | app-id, consistency-group-id | app-id |

The tenant can inventory its storage object with "export-list." For example, the tenant can be notified of a size of the created export and how much storage space is used.

| API | Required Inputs | Optional Inputs | Outputs |
|---|---|---|---|
| export-list | | export-name, app-id | export-name, service, app-id, consistency-group-id, size, size-used |

Furthermore, the storage provider can generate reports showing all the storage objects provisioned by the tenants and be alerted as to when violations of the SLO occur. This service monitoring tool can use the storage provider APIs to collect the necessary information.

4. Flow Diagram for SLO Management

Figure 6:
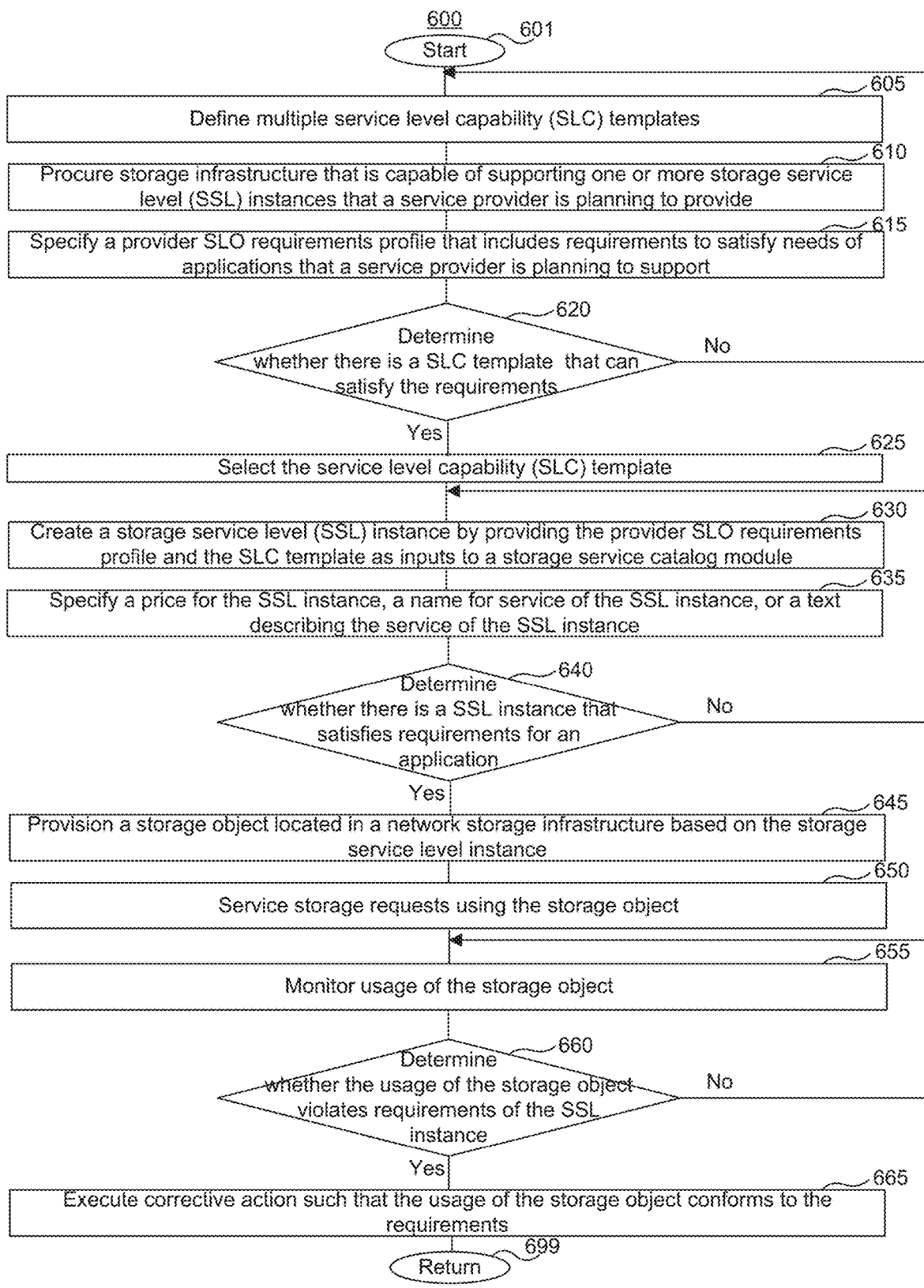
FIG. 6 is a flow diagram illustrating a process for managing network storage controllers by service level objectives, in various embodiments.

FIG. 6 is a flow diagram illustrating a process for managing network storage controllers by service level objectives, in various embodiments. The process 600 starts at block 605, where the process 600 receives multiple SLC templates. The SLC templates can be defined in a way independent of underlying hardware technologies using one or more of SLO dimensions. The SLO dimensions can include performance, local recovery, backup recovery, disaster recovery, availability, security, space guarantee, or durability. The SLC templates can have different attribute values of at least one of the SLO dimensions. The attribute values of the SLO dimensions can be independent of the underlying hardware technologies and map multiple configuration settings of the network storage controllers. The SLC templates can be configured to leverage new hardware technologies without changing the definitions of the SLC templates.

At block 610, the process 600 procures storage infrastructure that is capable of supporting one or more SSL instances that a service provider is planning to provide. At block 615, the process 600 specifies a Provider SLO Requirements Profile that includes requirements to satisfy needs of applications that a service provider is planning to support.

At decision block 620, the process 600 determines whether there is an SLC template from the SLC templates that can satisfy the requirements. If not, the process 600 can go back to step 605 to define new SLC templates. If there is a suitable SLC template, at block 625, the process 600 selects the SLC template. At block 630, the process 600 creates an SSL instance by providing the Provider SLO Requirements Profile and the SLC template as inputs for a storage service catalog module. At block 635, the process 600 can further specify a price for the SSL instance, a name for service of the SSL instance, or a text describing the service of the SSL instance.

At decision block 640, the process 600 determines whether there is an SSL instance that satisfies application level requirements for an application to be executed. If not, the process 600 can go back to block 630 to re-create additional SSL instances. If there is such an SSL instance, at block 645, the process 600 provisions a storage object located in a network storage infrastructure based on the SSL instance. The storage object can include a file, a LUN (logic unit number in SAN environment) or a volume that conforms to requirements of the SSL instance.

At block 650, the process 600 services storage asks to use the storage object. At block 655, the process 600 can monitor the usage of the storage object. At decision block 660, the process 600 determines whether the usage of the storage object violates requirements of the SSL instance. If that is so, at block 665, the process 600 executes corrective action such that the usage of the storage object conforms to the requirements.

There can be multiple SSL instances for different levels in the scheme, e.g., tenant level, application level, or storage object level (e.g., as shown in FIGS. 13 and 14). The process 600 can determine which SSL instance is controlling. For example, a first SSL instance can be selected for a tenant of the network storage controllers, and a second SSL instance can be selected for an application to be performed for the tenant. The first SSL instance can be overridden by the second SSL instance when the storage object is provisioned for the application.

Similarly, a first SSL instance can be selected for an application that will be performed for the tenant of the network storage controllers, and a second SSL instance can be selected for a storage object to accommodate the requirements of the application. The first SSL instance can be overridden by the second SSL instance when the storage object is provisioned for the application.

Those skilled in the art will appreciate that the logic illustrated in FIG. 6 and described above, may be altered in a variety of ways. For example, the order of the logic may be rearranged, substeps may be performed in parallel, illustrated logic may be omitted, other logic may be included, etc.

With the emergence of the service provider model in both public clouds and private data centers, the consumption of storage resources via a service based model is gaining traction. The management by SLO framework is presented to facilitate the consumption. Its main tenets are a) describe the storage services via measurable attributes that are independent of vendor technology, b) look at all of the different SLO dimensions in an integrated manner, c) the need for best-practices-based (qualified) storage and application level templates, and d) the various granularities at which these SLO notions can be applied. This framework helps storage providers perform storage planning, deployment, management and support actions on a large scale in a cost-effective manner.

Figure 7:
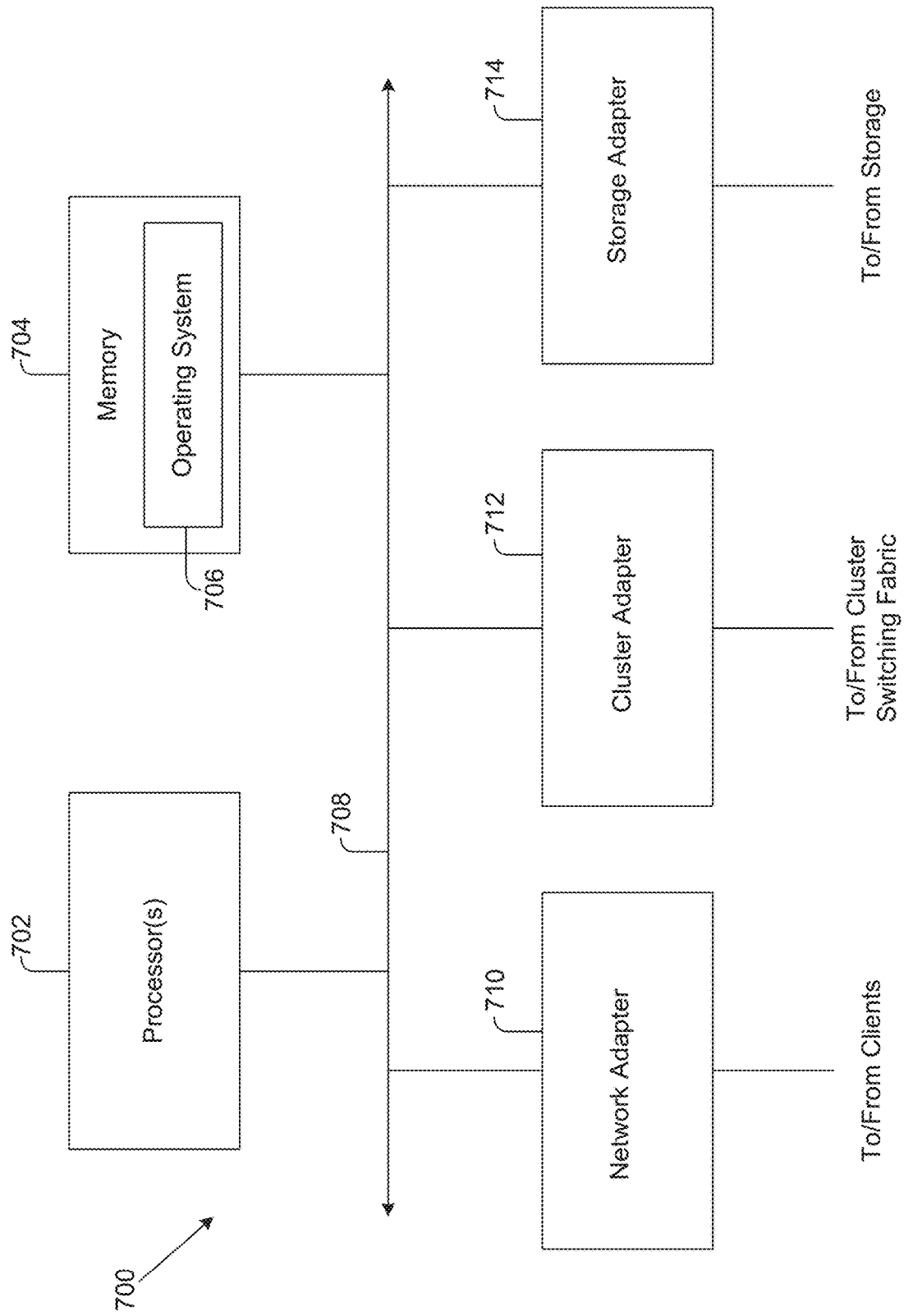
FIG. 7 is a high-level block diagram illustrating an example of a hardware architecture of a computing device that can manage the storage service using service level objectives, in various embodiments.

FIG. 7 is a high-level block diagram illustrating an example of a hardware architecture of a computing device that can manage the storage service using service level objectives, in various embodiments. A computing device 700 executes some or all of the processor executable process steps that are described below in detail. In various embodiments, the computing device 700 includes a processor subsystem that includes one or more processors 702. Processor 702 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The computing device 700 can further include a memory 704, a network adapter 710, a cluster access adapter 712 and a storage adapter 714, all interconnected by an interconnect 708. Interconnect 708 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The cluster access adapter 712 includes one or more ports adapted to couple the computing device 700 to other devices. In the illustrated embodiment, Ethernet can be used as the clustering protocol and interconnect media, although other types of protocols and interconnects may be utilized within the cluster architecture described herein.

The computing device 700 can be embodied as a single- or multi-processor storage system executing a storage operating system 706 that can implement a high-level module, e.g., a storage manager, to logically organize the information as a hierarchical structure of named directories, files and special types of files called virtual disks (hereinafter generally "blocks") at the storage devices. The computing device 700 can further include graphical processing unit(s) for graphical processing tasks or processing non-graphical tasks in parallel.

The memory 704 can comprise storage locations that are addressable by the processor(s) 702 and adapters 710, 712, and 714 for storing processor executable code and data structures. The processor 702 and adapters 710, 712, and 714 may, in turn, comprise processing elements and/or logic circuitry configured to execute the software code and manipulate the data structures. The operating system 706, portions of which are typically resident in memory and executed by the processors(s) 702, functionally organizes the computing device 700 by (among other things) configuring the processor(s) 702 to perform. It will be apparent to those skilled in the art that other processing and memory implementations, including various computer readable storage media, may be used for storing and executing program instructions pertaining to the technology.

The network adapter 710 can include multiple ports to couple the computing device 700 to one or more clients over point-to-point links, wide area networks, virtual private networks implemented over a public network (e.g., the Internet) or a shared local area network. The network adapter 710 thus can include the mechanical, electrical and signaling circuitry needed to connect the computing device 700 to the network. Illustratively, the network can be embodied as an Ethernet network or a Fibre Channel (FC) network. A client can communicate with the computing device over the network by exchanging discrete frames or packets of data according to predefined protocols, e.g., TCP/IP.

The storage adapter 714 can cooperate with the storage operating system 706 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 714 can include multiple ports having input/output (I/O) interface circuitry that couples to the disks over an I/O interconnect arrangement, e.g., a conventional high-performance, Fibre Channel (FC) link topology. In various embodiments, the cluster adapter 712 and the storage adapter 714 can be implemented as one adaptor configured to connect to a switching fabric, e.g., a storage network switch, to communicate with other devices and the mass storage devices.

In various embodiments, a method, performed by a computing device having one or more processing units, for managing network storage controllers of a storage network by employing service level capability (SLC) templates, is provided. The method comprises: selecting SLC template of the SLC templates based on hardware configuration of the storage network and a data storage provisioning request; creating at least one storage service level (SSL) instance based on an individual SLC template; provisioning a storage space in a storage server of the storage network for storing a data set based on the SSL instance, in response to the data storage provisioning request; and providing data access to the storage space.

In a related embodiment, the method further comprises: limiting a total number of backup copies of the data set based on an availability dimension of the individual SLC template. In another related embodiment, the provisioning comprises: provisioning the data set located in the storage server using a thin provisioning, based on a space guarantee dimension of the individual SLC template. In yet another related embodiment, the method further comprises: determining that a geographical location of the storage server for provisioning the data set is allowed by a geo-locality field of the security dimension of the individual SLC template.

In still another related embodiment, the method further comprises: selecting an data access authentication protocol based on an authentication field of the security dimension of the individual SLC template; and encrypting data sent or received by the storage server based on an end-to-end encryption field of the security dimension of the individual SLC template. In still yet another related embodiment, the method further comprises: crypto-deleting data by writing cryptographic data to a storage space where the data has been stored, according to a data deletion field of the security dimension of the individual SLC template.

In various embodiments, a method, performed by a computing device having one or more processing units, for managing network storage controllers by employing service level objectives (SLOs), is provided. The method comprises: receiving multiple service level capability (SLC) templates; creating at least one storage service level (SSL) instance using at least one of the SLC templates; provisioning a data set located in a network storage infrastructure based on the SSL instance; and servicing storage requests using the data set.

In a related embodiment, the method comprises: determining the SLC templates independently from underlying hardware technologies using one or more SLO dimensions. In another related embodiment, the method further comprises: determining the SLC templates that are configured to leverage new hardware technologies without changing the definitions of the SLC templates. In yet another related embodiment, the creating comprises: procuring storage infrastructure that is capable of supporting one or more SSL instances.

In still another related embodiment, the creating comprises: specifying a provider SLO requirements profile that includes requirements of applications; selecting a SLC template from the SLC templates that can satisfy the requirements; and creating a SSL instance by providing the provider SLO requirements profile and the SLC template as inputs to a storage service catalog component. In yet still another related embodiment, the creating comprises: specifying a price for the SSL instance, a name for service of the SSL instance, or a text describing the service of the SSL instance.

In still yet another related embodiment, the provisioning comprises: selecting a SSL instance from the at least one SSL instance that satisfies application level requirements for an application. In yet still another related embodiment, the storage object comprises a file, a LUN or a volume that conforms to requirements of the SSL instance. In still yet another related embodiment, the method further comprises: monitoring usage of the storage object; and when it is determined that the usage of the storage object violates requirements of the SSL instance, taking a corrective action such that the usage of the storage object conforms to the requirements.

In yet still another related embodiment, a first SSL instance is selected for a tenant of the network storage controllers, and a second SSL instance is selected for an application to be performed for the tenant; and wherein the first SSL instance is overridden by the second SSL instance when the storage object is provisioned for the application. In still yet another related embodiment, a first SSL instance is selected for an application to be performed for the tenant of the network storage controllers, and a second SSL instance is selected for a storage object for accommodating requirements of the application; and wherein the first SSL instance is overridden by the second SSL instance when the storage object is provisioned for the application.

In various embodiments, a processor-executable storage medium storing instructions for managing network storage controllers by service level objectives (SLOs) is provided. The storage medium comprises: instructions for creating multiple storage service level (SSL) instances using at least one of multiple service level capability (SLC) templates by using a storage provider application programming interface (API); instructions for provisioning a storage object located in a network storage infrastructure based on the SSL instance; and instructions for servicing storage requests using the storage object.

In a related embodiment, the instructions for defining the SLC templates comprises: instructions for defining the SLC templates using one or more graphical user interface (GUI) tools. In another related embodiment, the storage provider APIs do not describe the capabilities of a storage service by referring to vendor-specific features or technologies. In yet another related embodiment, the storage medium further comprises: instructions for generating a report showing provisioned storage objects that violate SLOs corresponding to the objects.

In various embodiments, a storage controller for managing network storage services by service level objectives (SLOs) is provided. The storage controller comprises: one or more processing units; a storage component configured to store multiple service level capability (SLC) templates; an instance component configured to create multiple storage service level (SSL) instances using at least one of the stored SLC templates; a provision component configured to provision a first storage object located in a network storage infrastructure based on a first created SSL instance of the SSL instances; and a correction component configured to: detect that usage of the first storage object violates the first SSL instance, identify a second created SSL instance of the created SSL instances that suits actual utilization of storage resources for the first storage object, and migrate data from the first storage object to a second storage object provisioned based on the second SSL instance.

In a related embodiment, the correction component is further configured to moving an application from the first storage object to the second storage object without need of migrating the data, if the second storage object uses the same underlying storage resource as the first storage object.

Various modifications and additions can be made to the embodiments discussed without departing from the scope of the disclosure. For example, while the embodiments described above refer to particular features, the scope also includes embodiments having different combinations of features and embodiments that do not include all of the described features. Accordingly, the scope is intended to embrace all such alternatives, modifications, and variations and all equivalents thereof.

What is claimed is:

1. A method, comprising:
    selecting from a plurality of storage service level (SSL) instances a first SSL instance for a tenant and a second SSL instance for an application of the tenant, wherein a SSL instance is based on resources of a storage domain assigned according to a service level capability (SLC) template which comprises a protection profile and a set of one or more storage profiles and which is independent of a particular storage domain, wherein a protection profile comprises storage service topology information and a first plurality of defined service level objective (SLO) dimensions, wherein the storage service topology information comprises nodes that represent storage services and relationships between the nodes that correspond to the first plurality of defined SLO dimensions, wherein the nodes are associated with the set of one or more storage profiles which comprises a second plurality of defined SLO dimensions;

provisioning a storage object in resources of a storage domain assigned to the second SSL instance; and managing usage of the provisioned storage object based on defined SLO dimensions of a SLC template corresponding to the second SSL instance.

2. The method of claim 1, further comprising:
creating a local backup copy of a data set in the provisioned storage object based on a data replication topology of the SLC template corresponding to the second SSL instance, wherein the storage service topology comprises the data replication topology.

3. The method of claim 1, further comprising:
creating a remote backup copy of a data set in the provisioned storage object on a storage device separate from the storage domain based on a defined backup recovery dimension of the defined SLO dimensions.

4. The method of claim 1, wherein managing usage of the storage object comprises:
controlling input/output (I/O) throughput rates between a performance ceiling and a performance floor specified by a defined performance dimension of the defined SLO dimensions.

5. The method of claim 1, further comprising:
encrypting data of a data set in the storage object based on an at-rest encryption field of a security dimension of the defined SLO dimensions.

6. A non-transitory machine-readable medium having stored thereon instructions for performing a method comprising machine executable code which when executed by at least one machine, causes the machine to:
select from a plurality of storage service level (SSL) instances a first SSL instance for a tenant and a second SSL instance for an application of the tenant, wherein a SSL instance is based on resources of a storage domain assigned according to a service level capability (SLC) template which comprises a protection profile and a set of one or more storage profiles and which is independent of a particular storage domain, wherein a protection profile comprises storage service topology information and a first plurality of defined service level objective (SLO) dimensions, wherein the storage service topology information comprises nodes that represent storage services and relationships between the nodes that correspond to the first plurality of defined SLO dimensions, wherein the nodes are associated with the set of one or more storage profiles which comprises a second plurality of defined SLO dimensions;

provision a storage object in resources of a storage domain assigned to the second SSL instance; and manage usage of the provisioned storage object based on defined SLO dimensions of a SLC template corresponding to the second SSL instance.

7. The non-transitory machine-readable medium of claim 6 further comprising instructions to:
create a local backup copy of a data set in the provisioned storage object based on a data replication topology of the SLC template corresponding to the second SSL instance, wherein the storage service topology comprises the data replication topology.

8. The non-transitory machine-readable medium of claim 6, further comprising instructions to:
create a remote backup copy of a data set in the provisioned storage object on a storage device separate from the storage domain based on a defined backup recovery dimension of the defined SLO dimensions.

9. The non-transitory machine-readable medium of claim 6, wherein the instructions to manage usage of the storage object comprises program instructions to:
control input/output (I/O) throughput rates between a performance ceiling and a performance floor specified by a defined performance dimension of the defined SLO dimensions.

10. The non-transitory machine-readable medium of claim 6, further comprising instructions to:
encrypt data of a data set in the storage object based on an at-rest encryption field of a security dimension of the defined SLO dimensions.

11. The non-transitory machine-readable medium of claim 6, further comprising instructions to determine that the second SSL instance overrides the first SSL instance and to populate an application programming interface instruction with a name of the second SSL instance.

12. The non-transitory machine-readable medium of claim 6, wherein the instructions to select the second SSL instance comprises the instructions to select the second SSL instance based, at least in part, on a determination of correspondence between an indication of the application and an indication of workload type for the second SSL instance.

13. The non-transitory machine-readable medium of claim 6, wherein the first plurality of defined SLO dimensions comprises an item selected from a list consisting of a defined local recovery dimension, a defined backup recovery dimension, and a defined disaster recovery dimension, wherein the second plurality of defined SLO dimensions comprises at least two of defined performance requirement, a defined availability requirement, a defined durability requirement, a defined space guarantee requirement, and a defined security requirement.

14. A computing device comprising:
a memory containing machine-readable medium comprising machine executable code having stored thereon instructions for performing a method of storing data;
a processor coupled to the memory, the processor configured to execute the machine executable code to cause the processor to:
select from a plurality of storage service level (SSL) instances a first SSL instance for a tenant and a second SSL instance for an application of the tenant, wherein a SSL instance is based on resources of a storage domain assigned according to a service level capability (SLC) template which comprises a protection profile and a set of one or more storage profiles and which is independent of a particular storage domain, wherein a protection profile comprises storage service topology information and a first plurality of defined service level objective (SLO) dimensions, wherein the storage service topology information comprises nodes that represent storage services and relationships between the nodes that correspond to the first plurality of defined SLO dimensions,
wherein the nodes are associated with the set of one or more storage profiles which comprises a second plurality of defined SLO dimensions;
provision a storage object in resources of a storage domain assigned to the second SSL instance; and
manage usage of the provisioned storage object based on defined SLO dimensions of a SLC template corresponding to the second SSL instance.

15. The computing device of claim 14, wherein the machine-readable medium further comprises instructions executable by the processor to cause the processor to:
perform scheduled local backup processes based on an item selected from a list consisting of a recovery point objective, a retention time, and a schedule start time of a defined local recovery dimension of the defined SLO dimensions.

16. The computing device of claim 14, wherein the instructions to manage usage of the storage object comprise instructions executable by the processor to cause the processor to:
control input/output (I/O) throughput rates between a performance ceiling and a performance floor specified by a defined performance dimension of the defined SLO dimensions.

17. The computing device of claim 14, wherein the machine-readable medium further comprises instructions executable by the processor to cause the processor to:
encrypt data of a data set in the storage object based on an at-rest encryption field of a security dimension of the defined SLO dimensions.

18. The computing device of claim 14, wherein the machine-readable medium further comprises instructions executable by the processor to cause the processor to determine that the second SSL instance overrides the first SSL instance and to populate an application programming interface instruction with a name of the second SSL instance.

19. The computing device of claim 14, wherein the instructions to select the second SSL instance comprise the instructions executable by the processor to cause the processor to select the second SSL instance based, at least in part, on a determination of correspondence between an indication of the application and an indication of workload type for the second SSL instance.

20. The computing device of claim 14, wherein the first plurality of defined SLO dimensions comprises an item selected from a list consisting of a defined local recovery dimension, a defined backup recovery dimension, and a defined disaster recovery dimension, wherein the second plurality of defined SLO dimensions comprises at least two of defined performance requirement, a defined availability requirement, a defined durability requirement, a defined space guarantee requirement, and a defined security requirement.

* * * * *